US006786154B2

(12) United States Patent
Fukui

(10) Patent No.: US 6,786,154 B2
(45) Date of Patent: Sep. 7, 2004

(54) MECHANISM FOR CORRECTING UNBALANCE OF A ROTOR

(75) Inventor: Takashi Fukui, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 101 days.

(21) Appl. No.: 10/078,702

(22) Filed: Feb. 21, 2002

(65) Prior Publication Data

US 2002/0112633 A1 Aug. 22, 2002

(30) Foreign Application Priority Data

Feb. 22, 2001 (JP) ....................................... 2001-046536

(51) Int. Cl.$^{7}$ ........................... F16F 15/34; B41F 27/12

(52) U.S. Cl. ................. 101/415.1; 101/410; 101/401.1; 702/173

(58) Field of Search ........................... 101/415.1, 407.1, 101/409, 410, 401.1, 378, 463.1; 702/173, 101

(56) References Cited

U.S. PATENT DOCUMENTS 5,813,346 A * 9/1998 Solomon .................... 101/483
6,505,142 B1 * 1/2003 Inoue et al. ................ 702/173
6,640,704 B2 * 11/2003 Siebolds et al. ............ 101/216
2003/0088383 A1 * 5/2003 Inoue et al. ................ 702/167

FOREIGN PATENT DOCUMENTS

JP 11-311863 * 11/1999
JP 2000-112141 * 4/2000

* cited by examiner

*Primary Examiner*—Leslie J. Evanisko
(74) *Attorney, Agent, or Firm*—Sughrue Mion, PLLC

(57) ABSTRACT

A mechanism for correcting unbalance of a rotor that is caused at positions at which at least one of a leading edge chuck and a trailing edge chuck that hold a sheet member disposed on a peripheral surface of the rotor varying in accordance with the sheet size. The unbalance is corrected by disposing, at a predetermined distance from a rotary shaft, an anchor having a fixed weight. In a state where the unbalance is corrected, a main balancer is purposely attached to the rotor to cause an unbalanced state. According to the position at which the trailing edge chuck attaches to the peripheral surface of the rotor, a second arm is moved by mechanical interlocking to maintain an angle $\theta_2$ with respect to a chuck holder. Consequently, unbalance is adjusted in accordance with the size of the sheet.

18 Claims, 6 Drawing Sheets

MECHANISM FOR CORRECTING UNBALANCE OF A ROTOR

BACKGROUND OF THE INVENTION

1. Field of the Invention

The present invention relates to a mechanism for correcting unbalance of a rotor that occurs when leading and trailing edges of a sheet member are held on a peripheral surface of the rotor and the rotor is rotated.

2. Description of the Related Art

Generally, a photosensitive printing plate (hereinafter, "printing plate"), comprising a sheet-like support (e.g., a thin aluminum plate) having disposed thereon a photosensitive layer, is used for printing. Printing plates having different vertical and horizontal dimensions are used depending upon the size of the item to be printed.

An image exposure apparatus is used to image-expose the printing plate. In one such image exposure apparatus, the printing plate is wound around a rotating drum and irradiated with a light beam corresponding to image data while the printing plate is rotated integrally with the rotating drum, whereby the printing plate is scan-exposed.

When the printing plate is wound around the rotating drum, ends of the printing plate along the circumferential direction of the rotating drum are nipped by a chuck and fixed between the chuck and the periphery of the rotating drum.

Specifically, a holding device (i.e., a chuck) corresponding to one end (e.g., a leading edge in the direction in which the printing plate is wound) of the printing plate along the circumferential direction of the rotating drum is attached at a predetermined position on the rotating drum. After the printing plate is wound around the rotating drum, a holding device (i.e., a chuck) corresponding to the other end (i.e., a trailing edge) of the printing plate is attached at a position on the rotating drum according to the size of the printing plate.

Since the chucks are attached at positions on the periphery of the rotating drum that differ depending on the size of the printing plate wound on the rotating drum, the balance of the rotating drum varies. For this reason, eccentricity occurs when the rotating drum rotates at high speed, which can cause deterioration in the quality of the image recorded on the printing plate.

In order to solve this problem, there has been the proposal to use an anchor and adjust the position at which the anchor is attached to the rotating drum in accordance with the size of the printing plate, to thereby adjust the balance of the rotating drum. Balance of the rotating drum is adjusted by multiplying the weight of the anchor and the distance from a rotary shaft to the position at which the anchor is attached (weight×distance=moment) to determine moment, and altering the moment (by altering at least one of the anchor weight and the distance) in accordance with the size of the printing plate.

However, with conventional structures, the position of the anchor must be adjusted each time the size of the printing plate varies, and the adjustment takes time and adversely affects processing efficiency. Moreover, the mechanism by which the position of the anchor is adjusted is complicated and the number of parts increases, whereby the weight of the rotating drum itself increases, and higher output power becomes necessary to rotate the drum at high speed, whereby costs escalate.

SUMMARY OF THE INVENTION

In consideration of the aforementioned facts, an object of the present invention is to provide a mechanism that is capable of correcting unbalance of a rotor by disposing, at a predetermined distance from a rotary shaft, an anchor having a fixed weight to correct unbalance caused by positions at which at least one of a leading edge chuck and a trailing edge chuck that hold a sheet member disposed on a peripheral surface of the rotor varying in accordance with the size of the sheet member.

To achieve the object mentioned above, according to one aspect of the present invention, there is provided a rotor, disposed with an unbalance correcting mechanism and around which a sheet member is wound and fixed, comprising: (a) a rotor body, including an axis of rotation and a peripheral surface for supporting the sheet member; (b) a chuck device for pressing a leading edge and a trailing edge of the sheet member against the peripheral surface of the rotor body, the chuck device including a first chuck and a second chuck and having a first mode, in which the first chuck is attached to the rotor body and the second chuck is apart from the rotor body, and a second mode, in which both the first and second chucks are attached to the rotor body; (c) a main balancer attached to the rotor body and having a first relative positional relation with the first chuck; and (d) a sub-balancer attached to the rotor body and having a second relative positional relation with the second chuck in the second mode; wherein the main balancer and the sub-balancer increase unbalance of the rotor in the first mode and reduce unbalance of the rotor in the second mode.

In accordance with another aspect of the present invention, there is provided an apparatus for forming an image on a printing plate, comprising: (I) a drum around which a printing plate is taken up and fixed, the drum including (a) a drum body, including an axis of rotation and a peripheral surface for supporting the sheet member, (b) a chuck device for pressing a leading edge and a trailing edge of the sheet member against the peripheral surface of the drum body, the chuck device including a first chuck and a second chuck and having a first mode, in which the first chuck is attached to the drum body and the second chuck is apart from the drum body, and a second mode, in which both the first and second chucks are attached to the drum body, (c) a main balancer attached to the drum body and having a first relative positional relation with the first chuck, and (d) a sub-balancer attached to the drum body and having a second relative positional relation with the second chuck in the second mode, wherein the main balancer and the sub-balancer increase unbalance of the rotor in the first mode and reduce unbalance of the rotor in the second mode; (II) a section for feeding the printing plate to the drum; (III) a section for rotating the drum; (IV) a section for recording an image onto the printing plate wound around the periphery of the drum body; and (V) a section for detaching the printing plate from the drum.

DETAILED DESCRIPTION OF THE PREFERRED EMBODIMENT

Figure 1:
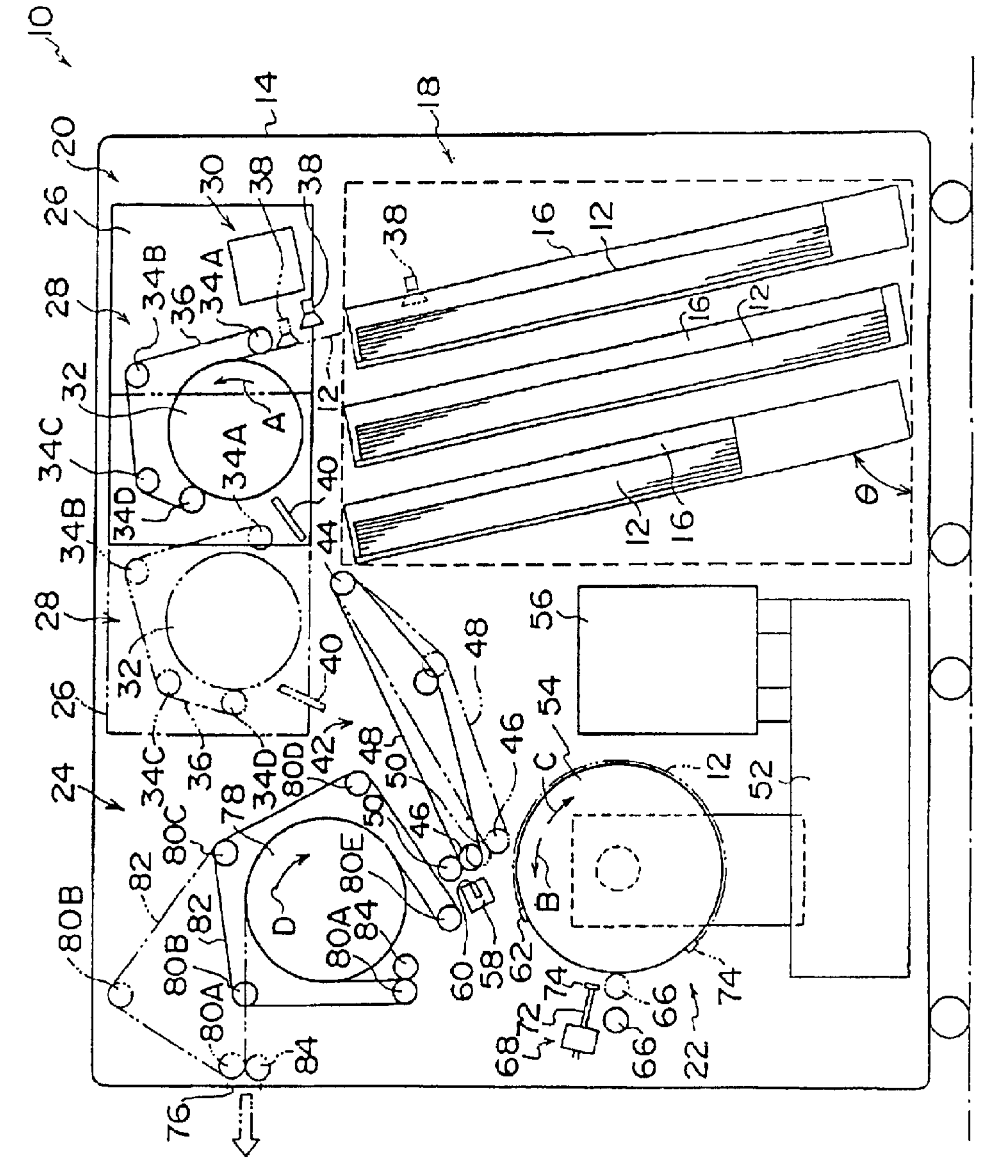
FIG. 1 is a schematic structural diagram showing an image exposure apparatus according to the present invention.

An embodiment of the present invention will be described with reference to the drawings. FIG. 1 shows a schematic configuration of an image exposure apparatus 10 according to the present invention. The image exposure apparatus 10 irradiates a sheet member (hereinafter, "printing plate 12") with a light beam modulated on the basis of image data to thereby scan-expose the printing plate 12. The printing plate 12 is a photosensitive planographic printing plate (having, for example, a thickness t of $0.3\times10^{-3}$ m and a density c of $2.7\times10^{3}$ $kg/m^{3}$) comprising a thin, rectangular plate-like support (e.g., aluminum) having disposed thereon a photosensitive layer. After the printing plate 12 is image-exposed in the image exposure apparatus 10, the printing plate 12 is developed and processed by an automatic developing apparatus (not illustrated). The minimum size of the printing plate 12 to which the present embodiment is applied is 500×500×0.2 mm, and the maximum size is 1160×940×0.3 mm.

The image exposure apparatus 10 is disposed with a machine casing 14 having therein a cassette loading unit 18, a plate conveying unit 20, a recording unit 22, and an ejection buffer unit 24. The cassette-loading unit 18 is disposed at the lower right side of the machine casing 14 in FIG. 1. Cassettes 16, which each house a number of the printing plates 12, are disposed within the cassette loading unit 18 and inclined at a predetermined angle θ.

The image exposure apparatus 10 can process different sizes (i.e., having different lengths and different widths) of the printing plates 12. Each printing plate 12 is accommodated within the cassettes 16 so that the photosensitive layer faces upward and an end of the printing plate 12 is disposed at a predetermined position. The cassettes 16 are loaded at predetermined intervals in the cassette loading unit 18 so that upper ends of the printing plates 12 housed in each cassette 16 reach substantially the same height.

The plate conveying unit 20 is disposed above the cassette loading unit 18, and the recording unit 22 is disposed at a lower, central region of the apparatus, adjacent to the cassette loading unit 18. The plate conveying unit 20 is disposed with a pair of side plates 26 (only one is shown in FIG. 1), and a reversal unit 28 and a sheet feeding unit 30 are mounted to the side plates 26.

The reversal unit 28 includes a reverse roller 32 having a predetermined outer diameter, and a plurality of small rollers (e.g., four small rollers 34A, 34B, 34C, and 34D in the present embodiment) is disposed around the periphery of the reverse roller 32. The small rollers 34A to 34D are positioned above the reverse roller 32, from the cassette loading unit 18 side to the recording unit 22 side. An endless conveyor belt 36 is entrained around the small rollers 34A to 34D, with the conveyor belt 36 extending to roughly half the circumference of the reverse roller 32 between the small roller 34A and the small roller 34D.

The sheet-feeding unit 30 has a plurality of suction cups 38 that suck upper ends of the printing plates 12 in the cassettes 16. The suction cups 38 are moved downward to oppose and suck the upper end of the printing plate 12, whereby the printing plate 12 is pulled out from the cassette 16 and the leading edge of the extracted printing plate 12 is inserted between the reverse roller 32 and the conveyor belt 36. In FIG. 1, the positions to which the suction cups 38 move are schematically shown by two-dotted chain lines.

The reverse roller 32 and the conveyor belt 36 rotate in the direction that the printing plate 12 is pulled out from the cassette 16 (i.e., the direction of arrow A in FIG. 1). The printing plate 12 is therefore nipped between the reverse roller 32 and the conveyor belt 36, pulled out from the cassette 16, wound around the periphery of the reverse roller 32 and conveyed and reversed while being curved. The radius of the reverse roller 32 is of a value (e.g., no less than 100 mm) such that the printing plate 12 folded or crinkled when the printing plate 12 is curved.

As shown by solid lines and two-dotted chain lines in FIG. 1, the side plates 26 move horizontally in accordance with the position of the cassette 16 from which the printing plate 12 is extracted. The suction cups 38 of the sheet feeding unit 30 face the printing plate 12 in the selected cassette 16.

The side plate 26 is disposed with a guide 40 below the small roller 34D. The printing plate 12 reversed by the reverse roller 32 is fed toward the guide 40 out from between the reverse roller 32 and the conveyor belt 36 at the small roller 34D side. A conveyer 42 is disposed above the recording unit 22 and the printing plate 12 fed from the reversal unit 28 is guided by the guide 40 to the conveyer 42.

The guide 40 swings in accompaniment with the movement of the side plate 26 so that the printing plate 12 is always guided toward the conveyer 42. The small roller 34D moves in accompaniment with the movement of the side plates 26, to thereby change the direction in which the printing plate 12 is fed from the reversal unit 28. The small roller 34C moves so that a substantially constant tension is imparted to the conveyor belt 36 when the small roller 34D moves. Accordingly, the printing plate 12 fed from the reversal unit 28 is gently curved by the guide 40.

In the conveyer 42, a conveyor belt 48 is entrained between a roller 44, which is disposed adjacent to the lower part of the plate conveying unit 20, and a roller 46, which is disposed adjacent to the upper part of the recording unit 22. The conveyor 42 is slanted such that the roller 46 is disposed lower than the roller 44.

Figure 2:
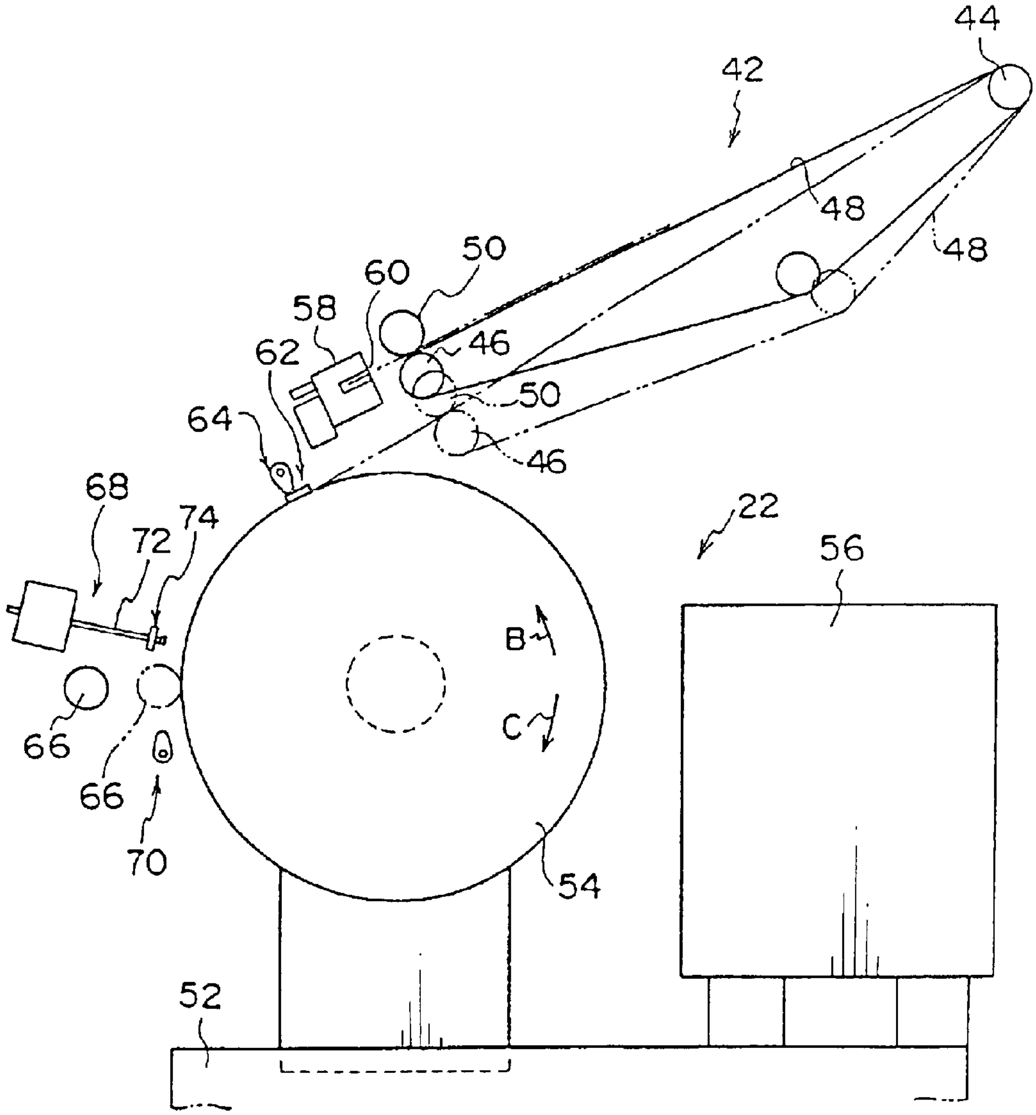
FIG. 2 is a schematic structural diagram showing a recording unit in the image exposure apparatus.

As shown in FIGS. 1 and 2, a roller 50 is disposed opposite the roller 46 in the conveyer 42. The printing plate 12 sent on the conveyer 42 is conveyed on the conveyor belt 48 and nipped by the rollers 46 and 50. In the recording unit 22, a rotating drum 54, which has a radius r of 0.165 m, and a recording head 56 are mounted on a base 52. A puncher 58 is disposed above the rotating drum 54.

As shown in FIG. 2, the puncher 58 is disposed with an opening 60 into which the leading edge of the printing plate 12 is inserted and held. When the leading edge of the printing plate 12 is inserted into the opening 60, the puncher 58 creates a positioning notch at a predetermined position in the leading edge of the printing plate 12.

When the notch is formed in the printing plate 12, the conveyer 42 drives the rollers 46 and 50 in reverse together with the conveyor belt 48, and pulls out the leading edge of the printing plate 12 from the opening 60. The conveyer 42 is disposed with swinging means (not illustrated). Using the roller 44 as a pivot, the swinging means swings the conveyor 42 downward so that the roller 46 approaches the rotating drum 54 (this swinging motion is shown by two-dotted chain lines in FIGS. 1 and 2). Accordingly, the printing plate 12 is conveyed along the conveyor belt 48 toward the rotating drum 54, with the leading edge of the printing plate 12 being directed toward a predetermined position on the peripheral surface of the rotating drum 54.

The rotating drum 54 is rotated by driving means (not illustrated) in the direction in which the printing plate 12 is attached to the rotating drum and exposed (i.e., the direction of arrow B in FIGS. 1 and 2) and in the direction in which the printing plate 12 is detached from the rotation drum (i.e., the direction of arrow C in FIGS. 1 and 2).

As shown in FIG. 2, a leading edge chuck 62 is mounted at a predetermined position on the peripheral surface of the rotating drum 54. When the printing plate 12 is attached to the rotating drum 54, the rotating drum 54 is first stopped so that the leading edge chuck 62 is positioned opposite to the leading edge of the printing plate 12 (printing plate attachment position) conveyed by the conveyer 42.

The recording unit 22 is disposed with an attaching cam 64 opposite to the leading edge chuck 62 at the printing plate attachment position. The attaching cam 64 is swung to press one end of the leading edge chuck 62, whereby the printing plate 12 can be inserted between the other end of the leading edge chuck 62 and the peripheral surface of the rotating drum 54. When the printing plate 12 has been inserted in this manner, the attaching cam 64 is returned to its original position so that the end of the leading edge chuck 62 is no longer pressed, and the leading edge of the printing plate 12 is nipped by and held between the leading edge chuck 62 and the peripheral surface of the rotating drum 54. At this time, a positioning pin (not illustrated) that protrudes from a predetermined position on the peripheral surface of the rotating drum 54 enters the notch formed by the puncher 58, to thereby position the printing plate 12 on the rotating drum 54.

When the leading edge of the printing plate 12 is fixed to the rotating drum 54, the rotating drum 54 is rotated in the direction of arrow B shown in FIGS. 1 and 2 and the printing plate 12 is wound around the peripheral surface of the rotating drum 54.

A squeeze roller 66 is disposed near the peripheral surface of the rotating drum 54 and downstream from the position at which the printing plate 12 is attached to the rotating drum 54. The squeeze roller 66 is moved toward the rotating drum 54, to thereby press and closely adhere the printing plate 12 to the peripheral surface of the rotating drum 54.

A trailing edge chuck attaching/detaching unit 68 is disposed near the rotating drum 54 and upstream from the squeeze roller 66, and a detaching cam 70 is disposed downstream from the squeeze roller 66. The trailing edge chuck attaching/detaching unit 68 includes a shaft 72, which projects toward the rotating drum 54 and has a tip at which a trailing edge chuck 74 is disposed.

When the trailing edge of the printing plate 12 wound around the rotating drum 54 opposes the trailing edge chuck attaching/detaching unit 68, the shaft 72 is moved towards the rotating drum 54 to attach the trailing edge chuck 74 at a predetermined position on the rotating drum 54. The trailing edge of the printing plate 12 is thereby nipped between the trailing edge chuck 74 and the rotating drum 54 and held.

When the leading and trailing edges of the printing plate 12 are held at the rotating drum 54, the squeeze roller 66 is moved away from the rotating drum 54. Thereafter, while the rotating drum 54 is rotated at a predetermined high speed, a light beam modulated on the basis of image data is emitted from the recording head 56 synchronously with the rotation of the rotating drum 54. The printing plate 12 is thereby scan-exposed on the basis of the image data.

After scan-exposure of the printing plate 12 is completed, when the trailing edge chuck 74 holding the trailing edge of the printing plate 12 is positioned opposite the trailing edge chuck attaching/detaching unit 68, the rotating drum 54 stops rotating. The squeeze roller 66 moves toward the rotating drum 54 and presses the printing plate 12 against the rotating drum 54. The trailing edge chuck attaching/detaching unit 68 receives the trailing edge chuck 74 and pulls the trailing edge chuck 74 away from the rotating drum 54. Consequently, the trailing edge of the printing plate 12 is released.

After the trailing edge chuck 74 is detached from the rotating drum 54, the rotating drum 54 rotates in the direction of arrow C shown in FIGS. 1 and 2, whereby the printing plate 12 is sent out from between the squeeze roller 66 and the rotating drum 54.

As shown in FIG. 1, the ejection buffer unit 24 is disposed above the squeeze roller 66. The rotating drum 54 rotates in the direction of arrow C to send the trailing edge of the printing plate 12 toward the ejection buffer unit 24. The rotating drum 54 stops at the position at which the printing plate is detached (i.e., where the leading edge chuck 62 opposes the detaching cam 70). By swinging the detaching cam 70 at this position, the leading edge chuck 62 is pressed, whereby the leading edge of the printing plate 12 is no longer nipped between the leading edge chuck 62 and the rotating drum 54. As a result, the printing plate 12 is detached from the rotating drum 54.

The ejection buffer unit 24 includes an ejection roller 78 disposed on the inner side of an exhaust port 76 formed in the machine casing 14. A plurality of small rollers (e.g., small rollers 80A, 80B, 80C, 80D and 80E) is disposed around the ejection roller 78 and an endless conveyor belt 82 is entrained around the small rollers 80A to 80E. The conveyor belt 82 is thus entrained around the small rollers 80A through 80E in a range of between about ½ to about ¾ the circumference of the discharge roller 78.

The small roller 80A projects toward the squeeze roller 66 in the recording unit 22, and an idle roller 84 is disposed to oppose the small roller 80A. The printing plate 12 sent out from the recording unit 22 is guided to between the small roller 80A and the idle roller 84 and is nipped thereby.

By rotating the ejection roller 78 in the direction in which the printing plate 12 is pulled out (i.e., the direction of arrow D in FIG. 1), the printing plate 12 nipped between the small roller 80A and the roller 84 is pulled out from the recording unit 22, guided to between the ejection roller 78 and the conveyor belt 82, nipped by the same, and thereby wound around the ejection roller 78. By nipping the leading edge (i.e., the trailing edge when the printing plate 12 is sent out from the recording unit 22) of the printing plate 12 between the small roller 80A and the idle roller 84, the printing plate 12 wound around the ejection roller 78 is temporarily held.

As shown by two-dotted chain lines in FIG. 1, in the ejection buffer unit 24, the small roller 80A and the idle roller 84 move to a position where they oppose the discharge opening 76. The small roller 80A and the idle roller 84 rotate integrally, thereby directing the leading edge of the printing plate 12 to the discharge opening 76. The small roller 80B above the small roller 80A moves in accompaniment with the movement of the small roller 80A to impart a predetermined tension to the conveyor belt 82.

When the leading edge of the printing plate 12 is directed to the discharge opening 76, the ejection roller 78 is rotated in the direction that the printing plate 12 is fed out (i.e., the direction opposite to the direction of arrow D) at a rotational speed that corresponds to the speed at which the printing plate 12 is conveyed at processing apparatuses, such as an automatic developing apparatus, disposed adjacent to the discharge opening 76. In this manner, the printing plate 12 is sent out from the discharge opening 76.

Figure 3:
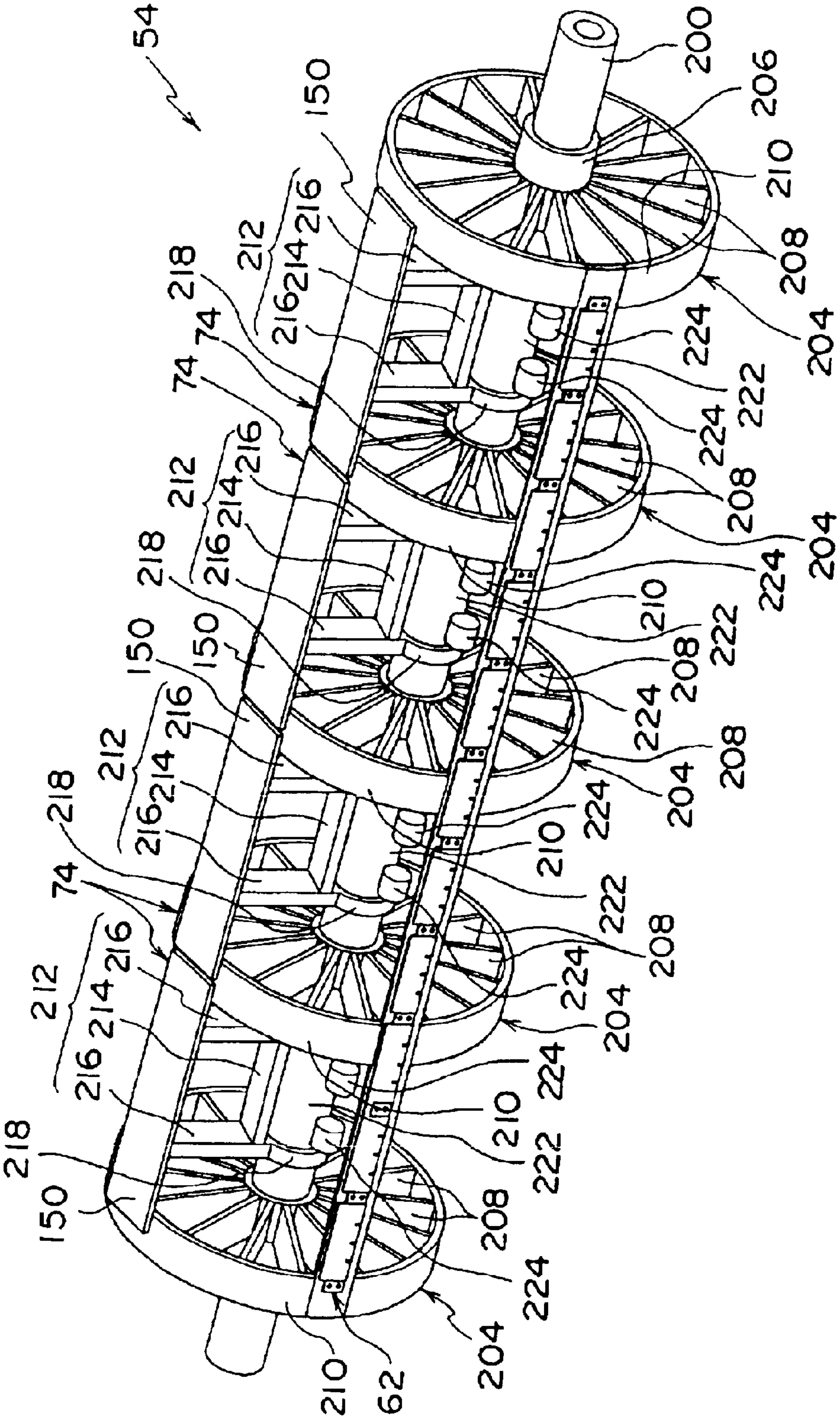
FIG. 3 is a schematic perspective view of a rotating drum according to an embodiment of the present invention.

Structural details of the rotating drum 54 are illustrated in FIG. 3.

The rotating drum 54 is disposed with a rotary shaft 200. Each end of the rotary shaft 200 is axially supported by a bearing (not illustrated). A drive system coupling member (e.g., gear or sprocket) is attached to one of the ends of the rotary shaft 200. Consequently, when the rotational force of the driving unit is received by the coupling member, the rotary shaft 200 rotates.

The length of the rotary shaft 200 in the axial direction thereof is longer than the maximum width of the printing plate 12.

Wheel-shaped guiding members 204 are disposed at predetermined intervals in the axial direction of the rotary shaft 200.

In the guiding member 204, short ribs 208 extend radially from a bearing 206 through which the rotary shaft 200 is inserted and fitted. The ribs 208 have a thin, plate-like configuration, and the length of each rib 208 is substantially the same.

The distal end of each of rib 208 is fixed to the inner periphery of a cylindrical body 210. That is, the cylindrical body 210 is supported by the ribs 208 to the rotary shaft 200. The width of the cylindrical body 210 is substantially the same as the width of the ribs 208.

The guiding member 204 is formed by the ribs 208 and the cylindrical body 210. The outer periphery of each cylindrical body 210 is disposed on a peripheral locus at a predetermined radial position of the rotary shaft 200, and serves as the surface upon which the printing plate 12 is wound.

In the present embodiment, a plurality (five) of guiding members 204 is disposed along the axial direction of the rotary shaft 200.

The printing plate 12 is supported in the axial direction of the rotary shaft 200 only at the outer peripheries of the cylindrical bodies 210 (i.e., by a length corresponding to the sum total of the widths of the five cylindrical bodies 210), and the printing plate 12 spans gaps between adjacent pairs of the cylindrical bodies 210. In the present embodiment, the ratio of the support width with respect to the width of the printing plate 12 is ⅕ in consideration of the material and thickness of the printing plate 12.

A chuck holder 212 is disposed between the guiding members 204 at the rotary shaft 200. The chuck holder 212 comprises a base 214, which is disposed along the peripheral surface of the rotary shaft 200, and a pair of arms 216 that are parallel to each other. Each arm 216 extends in the radial direction of the rotary shaft 200 from longitudinal direction ends of the base 214.

In the chuck holder 212, a ring 218 is disposed at each longitudinal direction end of the base 214. The rotary shaft 200 is inserted into the rings 218, whereby the rings 218 are rotatably supported relative to the rotary shaft 200.

An attaching/detaching part 220 (see FIG. 4) for attaching and detaching the trailing edge chuck 74 is disposed as fixing means at a distal end of the arm 216. A cylindrical member 222 is disposed between the rings 218 of the chuck holder 212. The cylindrical member 222 has a periphery to which the base 214 is fixed.

The cylindrical member 222 is axially supported by the rotary shaft 200. Constant force springs 224 are attached to parts of the periphery of the cylindrical member 222. The constant force spring 224 functions to urge the chuck holder 212 in the direction of tensioning the printing plate 12 when the printing plate 12 is held by the trailing edge chuck 74 attached to the attaching/detaching unit.

Figure 4:
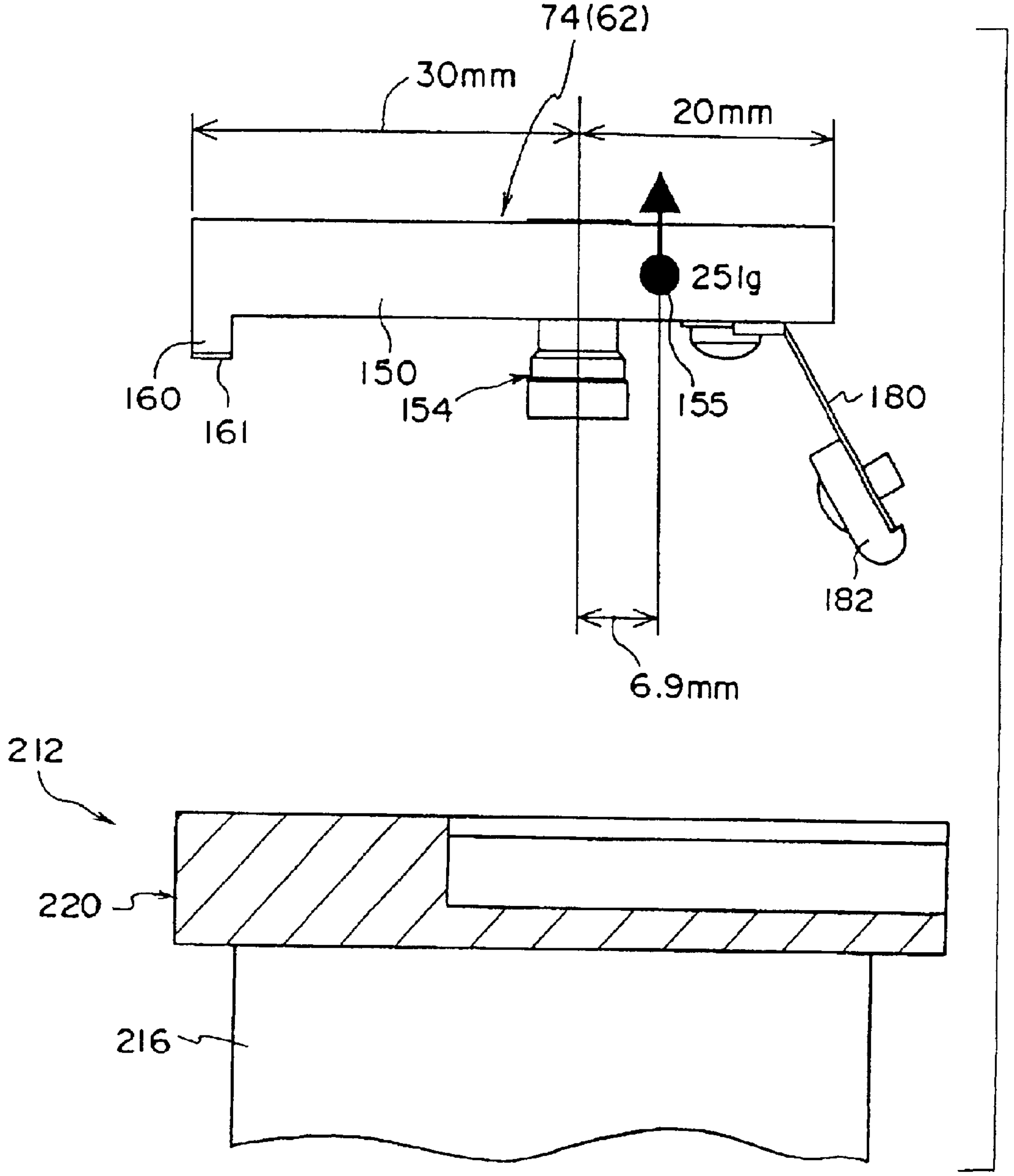
FIG. 4 is a side view of a chuck according to an embodiment of the present invention.

The trailing edge chuck 74 comprises four plates 150 whose longitudinal direction corresponds to the gaps between the guiding members 204. As shown in FIG. 4, the plate 150 swings like a seesaw in the width direction by using as a fulcrum a strut 154 that is attached to and detached from the chuck holder 212.

As shown in FIG. 4, in a state where all of the parts are attached, the position of the center of gravity 155 of the plate 150 is to the right side of the axis of the strut 154.

A clamp 160 is formed at one width direction end side of the plate 150 (to the left in FIG. 4). The clamp 160 is formed at a substantial right angle with respect to the plate 150 in the direction of the rotary shaft 200, and a rubber sheet 161 is adhered to a tip of the clamp 160. The rubber sheet 161 comes into direct contact with the printing plate 12 and is an important element for determining coefficient of friction at the time the printing plate 12 is held to peripheral surface of the cylindrical body 210 by the clamp 160. A coefficient of friction $\mu 1$ between the clamp 160 and the printing plate 12 is determined by the rubber sheet 161, and a coefficient of friction $\mu 2$ between the printing plate 12 and the periphery of the cylindrical body 210 is determined by their respective materials.

One end of a plate spring 180 bent in a substantial L shape is fixed to the under surface of the right end (in FIG. 4) of the plate 150. The direction in which the plate spring 180 is bent approaches the rotating drum 54 and an anchor 182 is attached to the other end of the plate spring 180. A surface at the distal-most end of the anchor 182 is substantially arc-shaped.

The plate spring 180 comes into contact with and engages with the attaching/detaching part 220 via the anchor 182. Specifically, when the trailing edge chuck 74 approaches the chuck holder 212, the anchor 182 first comes into contact with the attaching/detaching part 220. When the trailing edge chuck 74 further approaches the chuck holder 212, the plate spring 180 is elastically deformed. An urging force generated by the elastic deformation swings the plate 150 around the strut 154 to thereby generate the pressing force of the clamp 160.

The leading edge chuck 62 is attached at a predetermined position on the guiding member 204, waits for the leading edge of the printing plate 12 coming from a direction tangential to the rotating drum 54, and clamps the printing plate 12. Because the length of the printing plate 12 varies, after the printing plate 12 begins to wind around the rotating drum 54, the position at which the trailing edge will be wound varies according to the size of the printing plate 12. Consequently, the position of the chuck holder 212 at the periphery of the rotary shaft 200 is determined according to the size of the printing plate 12. The trailing edge chuck 74 is attached to the chuck holder 212 at a predetermined timing, and the trailing edge of the printing plate 12 is clamped, thereby enabling the front and trailing edges of the printing plate 12 to be claimed.

In the rotating drum 54 having the above configuration, the leading edge chuck 62 is pre-fixed on the peripheral surface of the rotating drum 54 and the trailing edge chuck 74 is detachably attached.

Moreover, the position of the trailing edge chuck 74 is changed according to the size of the printing plate 12.

As described above, the members (leading edge chuck 62 and trailing edge chuck 74) attached to the peripheral surface of the rotating drum 54 cause unbalance when the rotating drum 54 rotates. Since the unbalance causes the rotating drum 54 to vibrate and rotate eccentrically when the rotating drum 54 rotates, in the present embodiment, the unbalance is corrected by a main balancer 250 and a sub-balancer 252 (see FIG. 5) that are disposed within the rotating drum 54.

The main balancer 250 and the sub-balancer 252 function to finally correct unbalance when a member such as the trailing edge chuck 74, whose position at the peripheral surface of the rotating drum 54 changes, is attached in a state where a member such as the leading edge chuck 62 is fixed at a predetermined position on the peripheral surface of the rotating drum 54 and the unbalance correction is completed.

Figure 5:
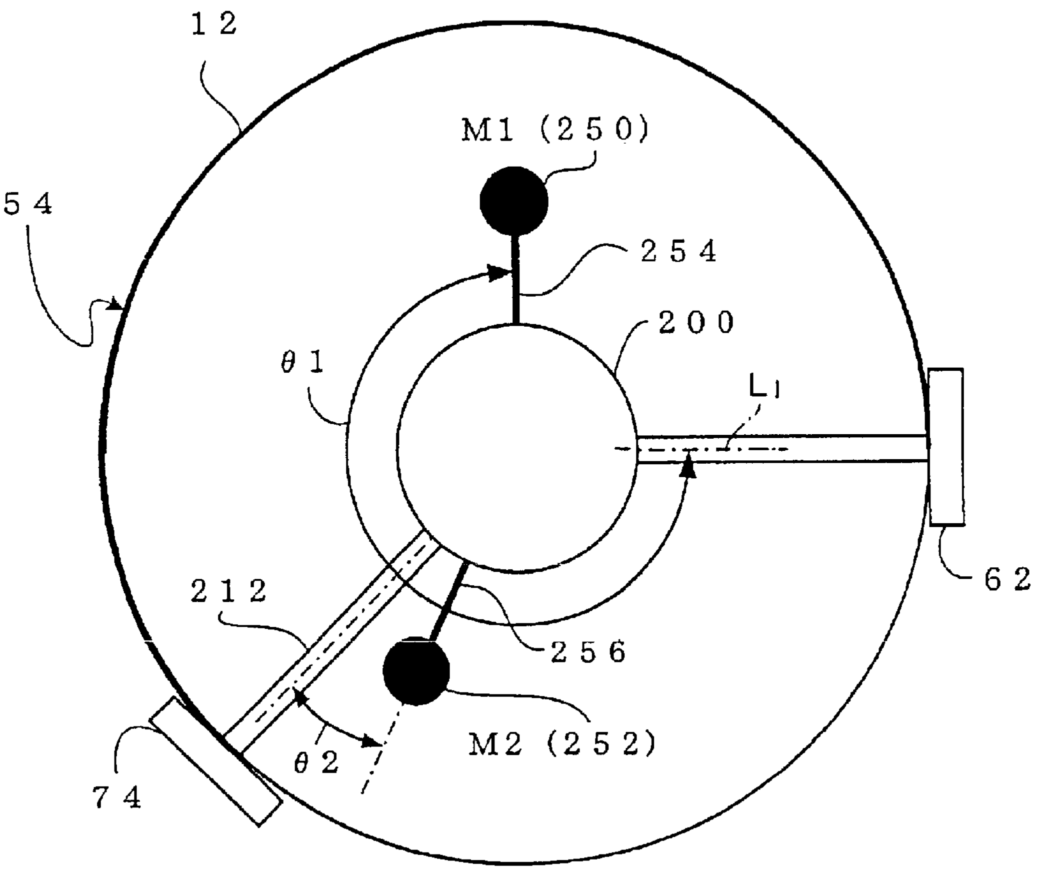
FIG. 5 is a side view of the rotating drum, and illustrates a state where a main balancer and a sub-balancer are attached to the rotating drum.

FIG. 5 is a side view of the rotating drum 54 as seen from the axial direction, and schematically shows a state in which the main balancer 250 and the sub-balancer 252 are attached within the rotating drum 54.

The leading edge chuck 62 is preliminarily attached and fixed at the predetermined position on the peripheral surface of the rotating drum 54, and holds the leading edge of the printing plate 12. Since the relative positions of the leading edge chuck 62 and the rotating drum 54 are unchanged, unbalance can be corrected in advance. When the size of the printing plate 12 (i.e., length of the printing plate 12 in the direction in which the printing plate 12 is wound around the rotating drum 54) is changed, the position at which the trailing edge chuck 74 is attached is changed. Therefore, when the trailing edge chuck 74 is attached to the rotating drum 54, to which the leading edge chuck 62 has already been attached, it becomes necessary to correct unbalance according to the position at which the trailing edge chuck 74 is attached.

A first arm 254 projects in the radial direction from the rotary shaft 200 at a predetermined angle θ1 with respect to a line L1 connecting the rotary shaft 200 and the leading edge chuck 62. The main balancer 250 is attached to a distal end of the first arm 254.

When the leading edge chuck 62 is attached to the rotating drum 54 (a state in which unbalance is corrected), the main balancer 250 is attached at a position in which the angle θ1 is 270° in the clockwise direction of FIG. 5 from the leading edge chuck 62. A moment M1 of the main balancer 250 is set to 7 kg·mm and this numerical value is always fixed.

Since the relative positional relation between the leading edge chuck 62 and the rotating drum 54 is unchanged, a predetermined unbalance state is set by maintaining the numerical value.

A second arm 256 projects in the radial direction from the rotary shaft 200 at a position having a predetermined angle θ2 in the counterclockwise direction of FIG. 5 from the chuck holder 212. The sub-balancer 252 is attached to a distal end of the second arm 256.

Figure 6A:
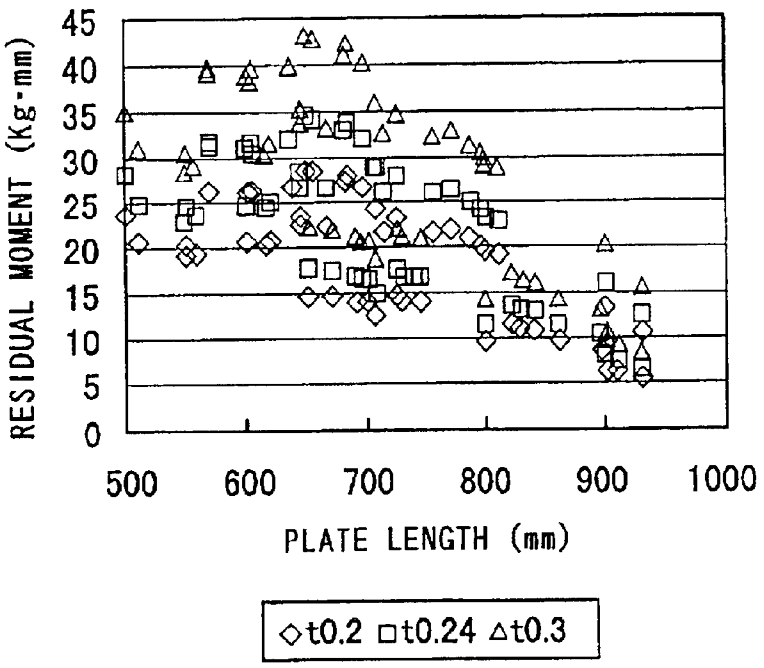
FIG. 6A is a characteristic diagram showing the relation between a take-up direction length of a printing plate and residual moment during rotation of the rotating drum, when the printing plate is wound around the rotating drum in a state in which the rotating drum has been balanced before the printing plate has been wound around the rotating drum (before correction).
Figure 6B:
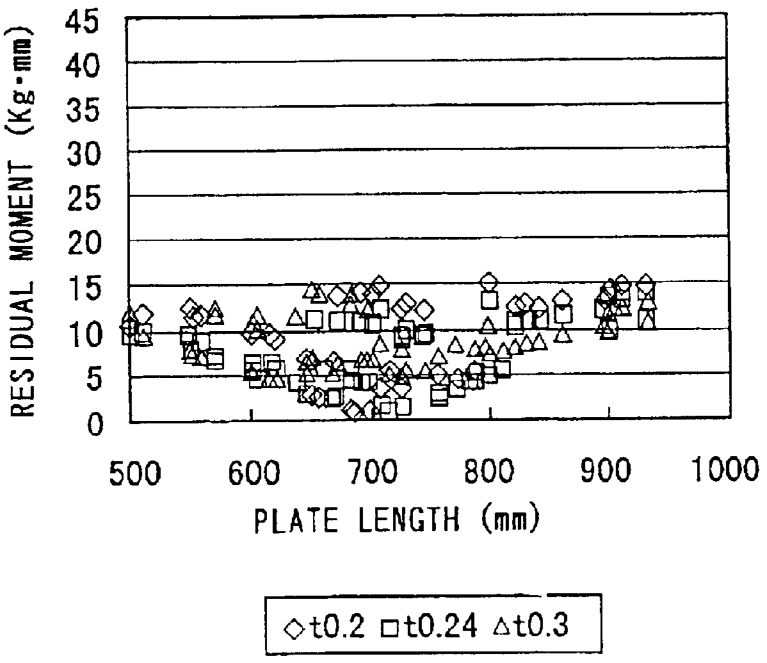
FIG. 6B is a characteristic diagram showing the relation between the take-up direction length of the printing plate and residual moment when a sub-balancer, which is automatically displaced in accordance with a position at which a trailing edge chuck is attached to the rotating drum, is attached to the rotating drum (after correction).

In the present embodiment, the angle θ2 is set to 70° and a moment M2 of the sub-balancer 252 is set to 23 kg·mm as an unbalance correction amount in a state where the trailing edge chuck 74 is attached to the rotating drum 54. Although the weight of the sub-balancer 252 is fixed, the second arm 256 is movable in the circumferential direction of the rotary shaft 200. Specifically, the second arm 256 is disposed with a driving mechanism (not illustrated) and moves together with the chuck holder 212 while maintaining the angle θ2 with respect to the chuck holder 212. The angle θ2 is an average angle at which a predetermined amount of unbalance or greater can be corrected at all of positions within the movable range of the trailing edge chuck 74. As a result, residual moment can be reduced to ⅓ (FIGS. 6A and 6B).

Consequently, regardless of the position of the trailing edge chuck 74, unbalance can be corrected so that the rotating drum 54 is stably rotated.

The action of the present embodiment will now be described.

In the image exposure apparatus 10, image data to be exposed on the printing plate 12 is inputted, and the size and the number of printing plates 12 on which an image is to be formed by exposure are set. When a command to initiate image exposure is given, image exposure processing of the printing plate 12 begins. The command may be given by disposing an operation panel on the image exposure apparatus 10 and operating switches on the operation panel, or by a signal from an image processor or the equivalent for outputting image data to the image exposure apparatus 10.

When the command to initiate processing is given, the sheet feeding unit 30 is moved together with the reversal unit 28 to a position corresponding to the cassette 16 housing the printing plate 12 of the designated size. The printing plate 12 in the corresponding cassette 16 is then sucked and extracted by the suction cup 38 and sent to between the reverse roller 32 of the reversal unit 28 and the conveyor belt 36. The printing plate 12 is nipped between and carried by the reverse roller 32 and the conveyor belt 36, and sent to the conveyer 42.

In the conveyer 42, the leading edge of the printing plate 12 is first inserted into the insertion opening 60 of the puncher 58. The puncher 58 punches a positioning notch at a predetermined position in the printing plate 12. After the notch is formed in the printing plate 12, the conveyer 42 pulls the printing plate 12 out from the insertion opening 60 of the puncher 58, and the printing plate 12 is sent along a direction tangential to the rotating drum 54 toward the peripheral surface of the rotating drum 54.

When the leading edge of the printing plate 12 is held on the rotating drum 54 by the leading edge chuck 62, the printing plate 12 is wound around the rotating drum 54 while being squeezed by the squeeze roller 66. Subsequently, the trailing edge of the printing plate 12 is held on the rotating drum 54 by the trailing edge chuck 74 as follows.

First, the trailing edge chuck attaching/detaching unit 68 is released (from being fixed) and positioned to correspond to the position of the trailing edge position of the printing plate 12. Once the attaching/detaching unit 68 is positioned, the trailing edge chuck attaching/detaching unit 68 is fixed again. The trailing edge chuck attaching/detaching unit 68 is moved by a moving mechanism (not illustrated).

Next, the trailing edge chuck 74 is passed from the trailing edge chuck attaching/detaching unit 68 to the rotating drum 54 and is attached at the predetermined position on the rotating drum 54. Thereafter, the trailing edge chuck attaching/detaching unit 68 releases the trailing edge chuck 74 (from being fixed) in order to allow the constant force spring 224 to urge the printing plate 12.

After the leading and trailing edges of the printing plate 12 are held by the respective chucks (i.e., the leading edge chuck 62 and the trailing edge chuck 74), the printing plate 12 is scanned and exposed in the recording unit 22 by being irradiated with a light beam on the basis of the image data from the recording head 56 while the rotating drum 54 is rotated at high speed. While the rotating drum 54 is rotated at high speed, the force by which the printing plate 12 is nipped by the leading edge chuck 62 and the trailing edge chuck 74 is enhanced by the action of the centrifugal force of the rotating drum 54.

After scan-exposure of the printing plate 12 is completed, the trailing edge chuck attaching/detaching unit 68 is fixed and the squeeze roller 66 is brought into contact with the rotating drum 54. The trailing edge chuck 74 is then moved apart from the rotating drum 54 and the printing plate 12 is sequentially fed to the ejection buffer unit 24. Thereafter, the leading edge chuck 62 is opened, whereby the printing plate 12 is detached from the rotating drum 54.

It should be noted that the trailing edge chuck 74 does not have to be of the attaching/detaching type, but may be of an open/close type (a mechanism similar to that of the leading edge chuck 62).

In the ejection buffer unit 24, the printing plate 12 is nipped between and conveyed by the small roller 80A and the roller 84 so as to be wound around the ejecting roller 78. Thereafter, the small roller 80A and the roller 84 are moved opposite to the discharge opening 76 and the printing plate 12 is sent from the discharge opening 76 at a predetermined conveying speed.

The nipping, tensioning, and holding of the printing plate 12 on the rotating drum 54 by the leading edge chuck 62 and the trailing edge chucks 74 will now be described in detail.

When the ends of the printing plate 12 come between the cylindrical body 210 of the guiding member 204 and the plate 150, the cam 64 is released so that the urging force of the plate spring 180 causes the plate 150 to swing around the strut. Due to this swing, the clamp 160 is moved in the direction toward the peripheral surface of the rotating drum 54, whereby the printing plate 12 is nipped between the clamp 160 and the peripheral surface of the cylindrical body 210.

When the printing plate 12 reaches the predetermined position, the trailing edge chuck 74 is attached to the rotating drum 54. Consequently, the urging force of the plate spring 180 works in accompaniment with the movement for attaching the trailing edge chuck 74, the plate 150 is gradually swung by using the strut 154 as a fulcrum, and the positioned printing plate 12 is nipped between the trailing edge chuck 74 and the peripheral surface of the cylindrical body 210 of the guiding member 204.

After the leading edge chuck 62 and the trailing edge chuck 74 finish chucking the printing plate 12, the rotating drum 54 starts rotating at high speed to record the image.

Since the center of gravity of the plate 150 is on the side opposite to the clamp 160, with the strut 154 being situated therebetween, the centrifugal force acts on the center of gravity of the plate 150 in the same direction as that of the urging force of the plate spring 180. Therefore, the force by which the printing plate 12 is nipped is increased when the rotating drum 54 rotates at high speed (i.e., during image recording).

The peripheral surface of the rotating drum 54 in the present embodiment comprises substantially only the peripheral surfaces of the cylindrical bodies 210 of the guiding member 204. That is, the total area of the peripheral surfaces of the cylindrical bodies 210 is ⅕ of the area of the peripheral surface of the rotating drum 54.

The printing plate 12 engages with, is guided, taken up, and supported by only the peripheral surfaces of the cylindrical bodies 210. The cylindrical body 210 is supported coaxially with the rotary shaft 200 by the plurality of ribs 208 so as not to be eccentric with respect to the rotary shaft 200.

Since the five cylindrical bodies 210 are disposed at constant intervals along the axial direction of the rotary shaft 200, the entire printing plate 12 can be supported with an almost uniform balance.

The total area of the peripheral surfaces of the cylindrical bodies 210 can be determined by the material and thickness of the sheet member to be taken up (the printing plate 12 in the embodiment present). Since a photosensitive layer is formed on a metal support (e.g., aluminum), the printing plate 12 has a certain amount of strength and can retain an almost cylindrical shape when rolled up. Therefore, simply by disposing, as an auxiliary guide used at the time the printing plate 12 is positioned and taken up so as to dispose the printing plate 12 on the peripheral surface locus of a predetermined radius of the rotary shaft 200, the guiding member 204 in part of the whole area in which the printing plate 12 is taken up, the printing plate 12 can be taken up and held on the circumference locus with accuracy.

In this case, the direction in which each cylindrical body 210 rotates is continuous, so that the locus at the time of take-up can always be maintained.

Consequently, the weight of the rotating drum 54 itself can be largely reduced. Therefore, high-speed rotation of the drum required for high speed processing can be also realized by a low-output driving system. That is, it is unnecessary to use an expensive, high-output driving system.

The leading edge chuck 62 is preliminarily fixed at a predetermined position on the peripheral surface of the rotating drum 54 (correction of unbalance has already been completed). Therefore, a predetermined unbalance is purposely generated by the main balancer 250 (angle $\theta1=270°$, moment M1=7 kg·mm) attached to the first arm 254, which largely contributes to the correction of unbalance occurring after the trailing edge chuck 74 is attached.

On the other hand, it is necessary to vary the position at which the trailing edge chuck 74 is attached to the peripheral surface of the rotating drum 54 in accordance with the size of the printing plate 12. Conventionally, the weight and position of the balancer have had to be adjusted each time the size of the printing plate 12 changed. In the present embodiment, however, a predetermined unbalanced state is created by the main balancer 250, and the sub-balancer 252 having a fixed weight is thereafter moved in association with the movement of the chuck holder 212 on the basis of the position at which the trailing edge chuck 74 is attached. By moving the second arm 256, it becomes unnecessary to correct unbalance in the position at which the trailing edge chuck 74 is attached.

In the present embodiment, unbalance is corrected by the combination of the main balancer 250 and the sub-balancer 252. By providing the main balancer 250, the angle $\theta2$ is maintained with respect to the chuck holder 212 simply by moving the sub-balancer 252. The angle $\theta2$ is set as an angle at which unbalance can be effectively and uniformly corrected over the whole area within the movement range of the trailing edge chuck 74 in accordance with the size of the printing plate 12, and can be obtained by experiment or calculation.

FIGS. 6A and 6B are characteristic diagrams showing the relation between the size of the printing plate 12 (i.e., length of the printing plate 12 in the direction in which the printing plate 12 is wound around the rotating drum 54) and the residual moment at the time the rotating drum 54 rotates. FIG. 6A shows the relation between the size of the printing plate 12 and residual moment during rotation of the rotating drum, when the printing plate is wound around the rotating drum in a state in which the rotating drum has been balanced before the printing plate has been wound around the rotating drum (before correction).

As shown in FIG. 6A, residual moment is large, particularly when the plate length is 600 mm to 700 mm, and there are overall variations in the range of 30 kg·mm.

In contrast, FIG. 6B shows the relation between the size of the printing plate 12 and residual moment when the sub-balancer 212 is automatically displaced in accordance with the position at which the trailing edge chuck 74 is attached to the rotating drum 54 (after correction).

As shown in FIG. 6B, residual movement is suppressed as a whole to 15 kg·mm or less and decreases to about ⅓, in comparison with the case before correction. A particularly good result is obtained with respect to a plate length of about 700 mm, which is used quite frequently.

According to the present embodiment, an unbalanced state is purposely created by attaching the main balancer 250 in a state where the leading edge chuck 62 is attached to the rotating drum 54 and unbalance is corrected. The second arm 256 is moved (in the axial direction of the rotary shaft 200) automatically (by mechanical interlocking) in accordance with the movement of the chuck holder 212, that is, the position at which the trailing edge chuck 74 is attached, to thereby maintain the angle θ2 with respect to the chuck holder 212. Consequently, unbalance can be properly corrected in accordance with the size of the printing plate 12. Since the main balancer 250 can be fixedly disposed and the sub-balancer 252 is moved interlockingly with the attachment of the trailing edge chuck 74, it becomes unnecessary for a workman to have to move the sub-balancer 252 to correct unbalance, so that work efficiency can be improved.

Although the second arm 256 is mechanically moved interlockingly in the present embodiment, it is also possible to provide a driving system capable of moving the second arm 256 and electrically control the driving system to determine correction amount.

As described above, the present invention can correct unbalance of a rotor by disposing, at a predetermined distance from a rotary shaft, an anchor having a fixed weight to correct unbalance caused by positions at which at least one of a leading edge chuck and a trailing edge chuck that hold a sheet member disposed on a peripheral surface of the rotor varying in accordance with the size of the sheet member.

What is claimed is:

1. A rotor, disposed with an unbalance correcting mechanism and around which a sheet member is wound and fixed, comprising:

(a) a rotor body, including an axis of rotation and a peripheral surface for supporting the sheet member;

(b) a chuck device for pressing a leading edge and a trailing edge of the sheet member against the peripheral surface of the rotor body, the chuck device including a first chuck and a second chuck and having a first mode, in which the first chuck is attached to the rotor body and the second chuck is apart from the rotor body, and a second mode, in which both the first and second chucks are attached to the rotor body;

(c) a main balancer attached to the rotor body and having a first relative positional relation with the first chuck;

(d) a sub-balancer attached to the rotor body and having a second relative positional relation with the second chuck in the second and (e) a chuck holder swingable around the axis of rotation, with the second chuck being attachable to the rotor body via the chuck holder;

wherein the main balancer and the sub-balancer increase unbalance of the rotor in the first mode and reduce unbalance of the rotor in the second mode.

2. The rotor of claim 1, wherein the main balancer has a constant relative angle ($\theta_1$) around the axis of rotation with respect to the first chuck.

3. The rotor of claim 1, wherein the chuck holder is fixable and releasable at a desired position around the axis of rotation.

4. The rotor of claim 3, wherein the chuck holder is fixed at respective positions in a circumferential direction of the rotor body in accordance with lengths of different-sized sheet members.

5. The rotor of claim 1, wherein the sub-balancer is positioned at a constant relative angle ($\theta_2$) around the axis of rotation with respect to the chuck holder.

6. The rotor of claim 5, wherein the sub-balancer and the chuck holder are integrally connected to each other.

7. The rotor of claim 1, wherein the first chuck is a leading edge chuck for pressing the leading edge of the sheet member and the second chuck is a trailing edge chuck for pressing the trailing edge of the sheet member.

8. The rotor of claim 1, in combination with a printing plate, the printing plate being wound and fixed around the rotor.

9. The rotor of claim 1, wherein the rotor is a drum for fixing the sheet member at the time the sheet member is scan-exposed.

10. The rotor of claim 1, further comprising an urging structure for using the second chuck to pull the sheet member along a circumferential direction of the rotor body when the sheet member is pressed by the second chuck.

11. An apparatus for forming an image on a printing plate, comprising:

(I) a drum around which a printing plate is taken up and fixed, the drum including (a) a drum body, including an axis of rotation and a peripheral surface for supporting the printing plate, (b) a chuck device for pressing a leading edge and a trailing edge of the printing plate against the peripheral surface of the drum body, the chuck device including a first chuck and a second chuck and having a first mode, in which the first chuck is attached to the drum body and the second chuck is apart from the drum body, and a second mode, in which both the first and second chucks are attached to the drum body, (c) a main balancer attached to the drum body and having a first relative positional relation with the first chuck, (d) a sub-balancer attached to the drum body and having a second relative positional relation with the second chuck in the second mode, and (e) a chuck holder swingable around the axis of rotation, with the second chuck being attachable to the drum body via the chuck holder, wherein the main balancer and the sub-balancer increase unbalance of the rotor in the first mode and reduce unbalance of the rotor in the second mode;

(II) a section for feeding the printing plate to the drum;

(III) a section for rotating the drum;

(IV) a section for recording an image onto the printing plate wound around the periphery of the drum body; and (V) a section for detaching the printing plate from the drum.

12. The apparatus of claim 11, wherein the main balancer has a constant relative angle ($\theta_1$) around the axis of rotation with respect to the first chuck.

13. The apparatus of claim 11, wherein the chuck holder is fixable and releasable at a desired position around the axis of rotation.

14. The apparatus of claim 13, wherein the chuck holder is fixed at respective positions in a circumferential direction of the drum body in accordance with lengths of different-sized sheet printing plates.

15. The apparatus of claim 11, wherein the sub-balancer is positioned at a constant relative angle ($\theta_2$) around the axis of rotation with respect to the chuck holder.

16. The apparatus of claim 15, wherein the sub-balancer and the chuck holder are integrally connected to each other.

17. The apparatus of claim 11, wherein the first chuck is a leading edge chuck for pressing the leading edge of the printing plate and the second chuck is a trailing edge chuck for pressing the trailing edge of the printing plate.

18. The apparatus of claim 11, further comprising an urging structure for using the second chuck to pull the printing plate along a circumferential direction of the drum body when the printing plate is pressed by the second chuck.

* * * * *